Figure 1:
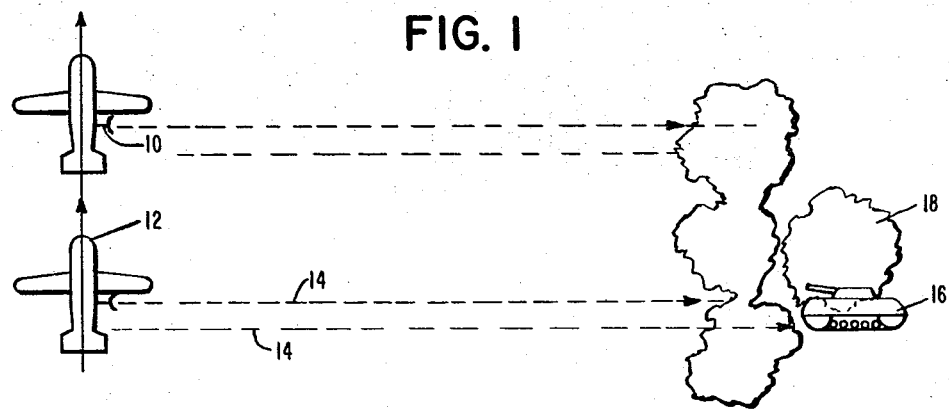

United States Patent

[11] 3,614,778

| [72] | Inventors | Robert R. Graham;<br>Keeve M. Siegel; Weston E. Vivian, all of<br>Ann Arbor, Mich. |
|---|---|---|
| [21] | Appl. No. | 508,731 |
| [22] | Filed | Nov. 18, 1965 |
| [45] | Patented | Oct. 19, 1971 |
| [73] | Assignee | Conductron Corporation<br>Ann Arbor, Mich. |

[54] FINE RESOLUTION RADAR FOR FOLIAGE PENETRATION
10 Claims, 3 Drawing Figs.

| [52] | U.S. Cl. | 343/5 R,<br>343/5 CM |
|---|---|---|
| [51] | Int. Cl. | G01s 9/02 |
| [50] | Field of Search | 343/5 W,<br>100.3 |

[56] References Cited
UNITED STATES PATENTS
3,500,395  3/1970  Foster et al. .................. 343/5

*Primary Examiner*—T. H. Tubbesing
*Attorney*—Barnes, Kisselle, Raisch & Choate

ABSTRACT: A method and apparatus for detecting by airborne radar the presence of a ground object hidden beneath foliage or the like. The radar signal is transmitted at a frequency having a wavelength relatively long with respect to the dimensions of the foliage and the like so that the scatter of the transmitted signal wave due to foliage is minimized and the transmitted wave passes through the foliage to be reflected from the ground object back to the airborne radar set. The optimum frequency range has been determined to be 100 to 1,000 mHz. The transmitted radar beam forms a radar path on the ground and it has been discovered that the optimum incidence angles measured in the vertical plane of the beam at the patch are in the range of 30° to 60°. The radar beam is transmitted at right angles to the direction of motion of the airborne radar set. The radar beam is preferably horizontally polarized to eliminate or minimize a scatter from vertical clutter such as tree trunks.

PATENTED OCT 19 1971  3,614,778

INVENTORS
ROBERT R. GRAHAM,
KEEVE M. SIEGEL,
WESTON E. VIVIAN

BY *Barnes, Kisselle, Raisch & Choate*

FINE RESOLUTION RADAR FOR FOLIAGE PENETRATION

This invention relates to a foliage penetration radar and in particular to a radar technique and apparatus with a fine resolution radar of the focused, coherent, synthetic-aperture type which employs long-wavelength electromagnetic radiation to penetrate foliage and detect objects beneath the foliage.

To effectively penetrate foliage and detect objects which lie beneath with a radar sensor, it is important that the foliage attenuation of electromagnetic radiation emitted by the radar be small. This attenuation can be caused by absorption and scattering of the incident electromagnetic radiation by the thousands of scatterers that comprise the foliage canopy in the form of leaves and small twigs which dominate the canopy and also the fewer tree trunks and large limbs which support the smaller structures. It is further important to reduce the background surrounding the objects of interest in order to achieve a high probability of detection. In this case, the background is caused by the backscattering of the incident electromagnetic radiation by the ground cover, commonly referred to as "ground clutter." The amount of ground clutter is dependent upon the backscattering property of each ground scatterer and the number of ground scatterers per unit area illuminated by the radar at any instant of time. The unit area in this case is defined by the area of the radar's resolution cell. Therefore, the background can be reduced by reducing the amount of energy backscattered from each individual scatterer in the ground cover and by reducing the number of scatterers per resolution cell.

The attenuation and backscattering properties of foliage can be substantially reduced by employing a relatively long wavelength. If the radiated wavelength is much greater than the dimensions of a scattering object, the object is a poor scatterer and also a poor absorber. Conversely, if the wavelength of the electromagnetic wave is of the same order of magnitude or less than the dimensions of a scattering object, the object is a good scatterer and can be a good absorber. Radar detection of an object hidden by foliage has not been effective in the past because the radiation wavelength employed has been of the same order of magnitude or less than the dimensions of the leaves, small twigs, and other small tree growths found in typical foliage. Past airborne radars employing focused, synthetic aperture techniques have employed short radiation wavelengths of approximately 3 centimeters or less (X-band and above) in order to capture all fine terrain detail in the area being surveyed. This occurs since the radiation wavelength is less than the dimensions of most terrain objects of interest, thus, these objects provide sufficient backscatter to be detected. This has been the result desired in these cases because all previous side-looking radars have been performing a mapping function. Mapping functions of open terrain by sidelooking radars is conceded to be prior state of the art. Although the radar imagery obtained with a foliage penetration radar might be called some sort of map, the radar is not performing a mapping function because to succeed in its objective, all fine map detail must be suppressed. The use of long wavelength radiation of the order of 1 meter will cause the fine detail of terrain to be suppressed leaving only gross terrain features. It will also be possible to detect relatively small metallic targets with meter wavelength radiation. This is true since the reflection coefficient of metallic objects is, in general, much greater than that of dielectric objects found in terrain; thus, small metallic objects can have a radar cross section which is higher than much larger dielectric objects.

The number of ground scatterers per unit area illuminated at any instant of time can be reduced by narrowing the azimuthal beamwidth of the radar antenna and shortening the transmitted pulse of the radar. In conventional radar systems, the antenna azimuthal beamwidth is directly proportional to the linear dimension of the antenna and inversely proportional to the radiation wavelength; therefore, some beam sharpening can be accomplished by increasing the antenna length. However, it is not practical, when employing long radiation wavelengths, to achieve the degree of beam sharpening desired by this method in airborne radar systems because the desired antenna length is many times longer than the physical length of even the largest aircraft. The desired beam sharpening can be achieved through the use of focused, coherent, synthetic antenna radar techniques. The sharpening in the range dimension can be achieved through the use of very short radiation pulses or by use of pulse compression techniques.

It is a further requirement that the electromagnetic phase aberration and attenuation induced when propagating through foliage be small. If the phase aberration or attenuation fluctuation is sufficiently large, the coherence property of the electromagnetic waves will be destroyed and thus preclude the use of synthetic aperture radars. Such phase aberration and attenuation can be caused by multiple reflection and refraction from the complex scattering ensemble that comprises the foliage canopy. The phase aberration and attenuation can be minimized by reducing the electromagnetic scattering properties of the foliage elements. This is again accomplished by selecting a radiation wavelength that is large compared with the linear dimensions of the predominance of the individual elements of which the foliage is comprised.

It is thus an object of the invention to detect hidden materials in which the permeability and/or permittivity is significantly different from free space and to minimize what is referred to as background clutter. It is a further object to produce radar imagery that has a stable phase characteristic, phase being defined as the relative phase between the transmitted pulse and received pulse. Thus, scintillation or glint resulting from highly sensitive fine resolution radar employing, for example, centimeter long wavelengths, is eliminated.

It is a further object of the invention to provide a radar system which is particularly adapted to change-detection in the emphasis of, and thus the possibility of mapping, interesting targets, e.g., objects having a significant variation in dielectric constant, such as metal. Also, it is an object to provide a radar system which eliminates much of aircraft motion compensation generally needed and thus the short-term stability problem is alleviated or eliminated.

It is thus an object to determine location of significant devices while eliminating so-called uninteresting targets such as fallen tree trunks and the like.

The invention contemplates a fine resolution radar of the aforementioned synthetic-aperture type that effectively penetrates foliage to detect objects beneath the foliage. This result is accomplished by operating a fine resolution radar of the aforementioned synthetic-aperture type at a low frequency to provide a long wavelength which propagates through foliage without appreciable scatter. It has been found through measurement that effective foliage penetration and detection of objects beneath the foliage in accordance with the present invention are not impaired substantially by phase and amplitude fluctuations of the reflected wave caused by foliage attenuation and scattering. Stated differently, effective object detection under foliage is achieved by operating the fine resolution radar of the aforementioned synthetic-aperture type at a low frequency to minimize ground return by making the ground clutter radar cross section small relative to the target cross section.

IN THE DRAWINGS

FIG. 1 diagrammatically illustrates an airborne radar used to detect objects beneath foliage in accordance with the present invention.

Figure 2:
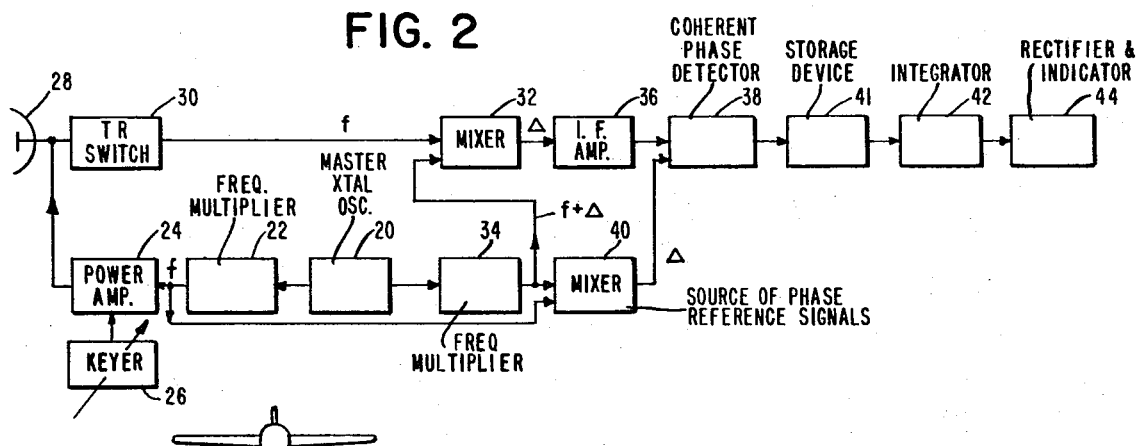

FIG. 2 is a block diagram of a transmitter, a receiver and a data processing circuit for fine resolution radar systems useful in practicing the present invention.

Figure 3:
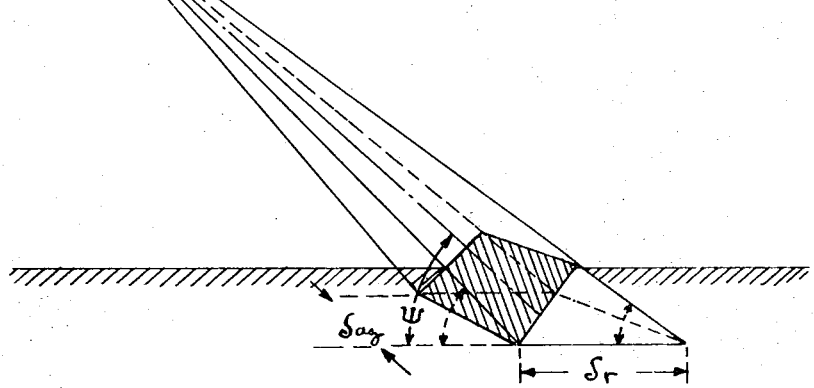

FIG. 3 diagrammatically illustrates a fine resolution radar beam and radar patch for purposes of explaining how object detection through foliage is achieved by the present invention.

REFERRING TO THE DRAWINGS

As shown in FIG. 1, a side-looking airborne radar 10 is carried by an airplane 12 flying in the direction of the arrows. Radar 10 is of the aforementioned synthetic-aperture type. Successive pulses, illustrated in broken lines designated by numeral 14, are transmitted by radar 10 at positions spaced along the flight path of airplane 12 to obtain a ground map including objects such as a tank 16 beneath foliage 18 and other ground clutter. The invention is specifically described primarily in connection with pulse transmission but is equally effective in continuous wave propagation.

With radar systems operated at frequency ranges above the X band, the wavelength is so small that the wave is attenuated and scattered substantially by foliage 18 and will not propagate through foliage 18 to effectively identify tank 16. However, in accordance with the present invention, radar 10 is operated at a low frequency and corresponding long wavelength such that attenuation and scattering due to foliage 18 does not substantially affect the phase and amplitude of pulses 14 as they propagate through foliage 18 and are reflected back to airplane 12 from tank 16. It has been found that effective foliage penetration is achieved when radar 10 is operated at a frequency range of between 100 to 1,000 megacycles/sec.

Radar 10 (FIG. 2) comprises a stable master oscillator 20 which serves as a source of the transmitted pulses 14 and as a reference signal source to provide phase coherence between transmitted waves and reflected waves. The output of oscillator 20 is stepped up to a frequency $f$ by a frequency multiplier 22 and fed to an amplifier 24. Amplifier 24 is controlled by a keyer 26 to provide periodic pulses of radar waves in a conventional manner. The radar waves from amplifier 24 are transmitted by an antenna 28. Echoes or reflections of the radar waves which return to antenna 28 are coupled through a transmit-receive (TR) switch 30 and applied to a mixer 32. Also applied to mixer 32 is a second signal from oscillator 20 which is stepped up to a frequency $f+\Delta$ by a frequency multiplier 34. The output of mixer 32 is an IF beat frequency $\Delta$.

The output of mixer 32 is amplified as indicated by block 36 and fed to a coherent detector 38. Detector 38 also receives a reference signal of frequency $\Delta$ from the output of a mixer 40 which in turn has inputs of frequency $f+\Delta$ from multiplier 34 and frequency $f$ from frequency multiplier 22. The reference signal of frequency $\Delta$ from mixer 40 is in phase with the radar signal transmitted from antenna 28. However, the signal of frequency $\Delta$ from amplifier 36 has phase variations corresponding to the echo received by antenna 28. Detector 38 derives bipolar signals representing a Doppler beat frequency indicative of the relative phases between the signals of frequency $\Delta$ from mixers 32 and 40. Phase and amplitude variations in the bipolar signal output from detector 38 are related to the position of a detected object within the transmitted radar beam. In general, the radar system described thus far in connection with FIG. 2 is similar to the coherent synthetic aperture system disclosed in U.S. Pat. No. 3,121,868, issued to W. Hausz et al. on Feb. 18, 1964, and entitled "High Resolution Object Location System," with the exception that the radar frequency $f$ transmitted from antenna 28 is in the range of 100 to 1,000 megacycles/sec. whereas the frequency disclosed in the Hausz et al. patent is in the X band, that is in the range of 5.2 to 10.9 kmc/sec. The Hausz patent, however, does not disclose a focused coherent synthetic aperture.

Referring again to FIG. 2, the bipolar signals from detector 38, including both phase and amplitude variations, are stored by suitable device 41, such as an optical storage device using silver halide film as a storage medium. The information stored in device 41 for each pulse repetition period is summed vectorially and focused for successive positions by an integrator 42 whose output is rectified and utilized in a suitable indicator as illustrated by block 44. In order to achieve fine resolution as in a conventional focused system, integrator 42 must sum the phase and amplitude of the bipolar signals stored on device 40 at low frequencies to achieve foliage penetration in accordance with the present invention.

As previously mentioned above, the focused synthetic-aperture system is used not merely to obtain fine resolution, but to minimize ground return and thereby improve target location. Referring to FIG. 3, this result is achieved by making the clutter cross section small relative to the target cross section or the ratio equal to or substantially greater than 1 as expressed by the following relationship:

$$\frac{\sigma_T}{\sigma_c} \geq |1$$

where
 $\sigma_T$ = the target radar cross section
 $\sigma_c$ = the clutter radar cross section
where
 $\delta_{az}\delta_R$ = the area of the radar patch or resolution cell
 $\delta_{az}$ = the dimension of the radar patch in the azimuth direction
 $\delta_R$ = the dimension of the radar patch in the slant range direction
 $\psi$ = the incident angle, and
 $\kappa$ = a constant depending on the reflectivity of particular ground cover.

It will be apparent that the clutter cross section for the patch relative to the target cross section can be made small with a fine resolution radar beam. Moreover, the clutter cross section depends on the dimensions as well as the dielectric constant and permeability of the individual bits of clutter, such as foliage and leaves on trees and the like. By using radar waves having a long wavelength relative to the dimensions of the individual bits of clutter such as leaves, attenuation and scattering of the wave by the leaves is decreased substantially to achieve effective foliage penetration.

In order to get the best results when propagating through foliage, the angle $\psi$ in FIG. 3 should be between approximately 30° and 60°. The lower angle actually determines the length of propagation path through the foliage. That is, the length of the propagation path is equal to the foliage canopy height times the cosecant of the angle $\psi$. At a $\psi$ of 30°, the propagation path length is twice the height of the canopy. As $\psi$ is made smaller, the path length increases thus increasing the abberation and attenuation induced by the foliage and thus makes it much less likely that penetration can be accomplished. The upper limit of 60° is set because of the degradation of resolution in the ground plane that occurs with increasing angle. That is, the range resolution of the radar is constant along the line connecting the radar and any target. The intersection of this line with the line describing the aircraft flight path describes what is called the slant plane of the radar. The slant plane intersects the ground plane at an angle $\psi$. The range resolution in the slant plane is constant and determined by the radar design parameters. The range resolution in the ground plane, however, is a projection of slant range resolution and is approximately equal to the resolution in the slant plane times the secant of the angle $\psi$. Therefore, at a $\psi$ of 60°, the range resolution in the ground plane exceeds the range resolution in the slant plane by a factor of 2. As $\psi$ is further increased, the ratio of the ground plane to slant plane range resolution becomes larger which impairs the radar's ability to detect small targets since the number of ground scatterers per unit area has been increased. It has been found through measurement, that the optimum angle for viewing targets through foliage is 45°. This is partly because of the reasons just given and partly because it has been noted optically that the forest tends to have sky openings near this angle caused by the fact that the trees tend to grow to different heights.

It is also preferable that horizontal polarization be used since the major scatterers in the undesired background are tree trunks which tend to grow vertically. Therefore, the return from the standing tree trunks can be minimized by using horizontal polarization providing the diameter of the tree trunk is small compared to the wavelength utilized as proposed above.

We claim:

1. In the method of radar object detection by means of a focused, synthetic-aperture, coherent, fine resolution, airborne radar wherein recurrent pulses of electromagnetic waves at a predetermined phase and predetermined frequency are transmitted by a transmitter moving through successive positions along a predetermined path, one of said pulses being transmitted at a corresponding one of said positions, reflected waves from each of said transmitted pulses are received after reflection from said object, bipolar signals indicative of the relative phase between said transmitted and said received waves corresponding to each of said pulses at each of said positions are derived, and said signals are summed vectorially, that improvement comprising transmitting said waves at only a single frequency having a wavelength relatively long with respect to dimensions of foliage and the like so that scatter of the transmitted wave due to foliage is minimized and said transmitted wave propagates through said foliage so as to be reflected from said object when said object is disposed beneath said foliage.

2. The method set forth in claim 1 wherein said waves are transmitted at only a single frequency in the range of 100 to 1,000 megacycles/second.

3. The method set forth in claim 1 wherein said radar is side-looking and airborne, said transmitted wave is in the form of a beam defining a radar patch on the ground, and the incidence angles measured in the vertical plane of said beam at said patch are in the range of from 30° to 60°.

4. In a fine resolution radar of the focused, synthetic-aperture, coherent, side-looking airborne type for object detection and having means for transmitting recurrent pulses of electromagnetic waves at a predetermined phase and frequency while said transmitting means is moved through successive positions along a predetermined path, one of said pulses being transmitted at a corresponding one of said positions, means for receiving reflected waves of each of said transmitted pulses after reflection from said object, means for deriving bipolar signals indicative of the relative phases between said transmitted and said received waves corresponding to each of said pulses at each of said positions, and means for summing said signals vectorially, that improvement comprising means for transmitting said pulses at a predetermined frequency having a wavelength relatively long with respect to dimensions of foliage and the like so that scatter of the transmitted wave due to foliage is minimized and said transmitted wave propagates through said foliage so as to be reflected from said object when said object is disposed beneath said foliage.

5. The device set forth in claim 4 wherein said predetermined frequency is in the range of 100 to 1,000 megacycles/sec.

6. The device set forth in claim 4 wherein said transmitted wave is in the form of a beam defining a radar patch on the ground, and the incidence angles measured in the vertical plane of said beam at said patch are in the range of from 30° to 60°.

7. The device set forth in claim 4 wherein said transmitted wave has substantially only a horizontal polarization.

8. In a method of detecting an object by directing a transmitted radar beam toward an object and comparing the transmitted and reflected beams, the improvement for detecting an object hidden by foliage comprising directing toward the hidden object a transmitted radar beam whose wavelength is much greater than the dimensions of the individual components of the foliage behind which the object is hidden, whereby the radar beam penetrates the foliage with relatively little attenuation to impinge upon the hidden object and be reflected thereby.

9. The method set forth in claim 8 wherein said radar beam is transmitted from an airborne radar apparatus and directed to an object on the ground, which object is hidden by foliage and other ground cover, and said radar beam is horizontally polarized further to reduce attenuation by vertical components of the foliage and ground cover.

10. The method as set forth in claim 9 wherein the frequency of the radar beam is in the range of 100 to 1,000 megacycles/second.